(12) United States Patent
Yasumura

(10) Patent No.: US 6,587,358 B1
(45) Date of Patent: Jul. 1, 2003

(54) SWITCHING POWER SUPPLY CIRCUIT

(75) Inventor: Masayuki Yasumura, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/030,840

(22) PCT Filed: May 11, 2000

(86) PCT No.: PCT/JP00/03038

§ 371 (c)(1),
(2), (4) Date: May 21, 2002

(87) PCT Pub. No.: WO01/86796

PCT Pub. Date: Nov. 15, 2001

(51) Int. Cl.$^7$ ............................................. H02M 3/335
(52) U.S. Cl. .................................................. 363/21.02
(58) Field of Search ........................ 363/16, 19, 21.01, 363/21.02, 21.03, 97, 131

(56) References Cited

U.S. PATENT DOCUMENTS

| | | | |
|---|---|---|---|
| 4,956,761 A | | 9/1990 | Higashi |
| 5,216,585 A | * | 6/1993 | Yasumura ..................... 363/19 |
| 5,495,405 A | * | 2/1996 | Fujimura et al. ............ 363/133 |
| 5,608,613 A | * | 3/1997 | Jansen ....................... 363/21.03 |
| 6,370,041 B2 | * | 4/2002 | Yasumura ..................... 363/19 |
| 6,370,043 B1 | * | 4/2002 | Yasumura ................ 363/21.02 |

FOREIGN PATENT DOCUMENTS

| | | |
|---|---|---|
| EP | 0 757 428 A1 | 2/1997 |
| JP | 64-26364 | 1/1989 |
| JP | 3-235662 | 10/1991 |
| JP | 6-153505 | 5/1994 |
| JP | 7-194113 | 7/1995 |
| JP | 9-107676 | 4/1997 |
| JP | 2000-102247 | 4/2000 |

OTHER PUBLICATIONS

Patent Abstracts of Japan, 06 153505, May 31, 1994, vol. 018, No. 475, Sep. 5, 1994.
Patent Abstracts of Japan, 07 194113, Jul. 28, 1995, vol. 1995, No. 10, Nov. 30, 1995.
Patent Abstracts of Japan, 01 026364, Jan. 27, 1989, vol. 13, No. 213, May 18, 1989.
Patent Abstracts of Japan, 03 235662, Oct. 21, 1991, vol. 016, No. 018, Jan. 17, 1992.
Patent Abstracts of Japan, 2000 102247, Apr. 7, 2000, vol. 2000, No. 07, Sep. 29, 2000.

* cited by examiner

*Primary Examiner*—Adolf Deneke Berhane
(74) *Attorney, Agent, or Firm*—Frommer Lawrence & Haug LLP; WIilliam S. Frommer

(57) ABSTRACT

A switching power supply circuit, which is small, lightweight, and highly efficient in power conversion, includes an insulating converter transformer, which is formed by a core with no gap and a primary and secondary winding wound on the core such that the mutual inductance between the windings exhibits an additive mode. A half-wave rectifier circuit is provided on the secondary side of the circuit and performs a rectification operation in the additive mode to obtain a secondary side DC output voltage. In a constant voltage control circuit system for stabilizing the secondary side output voltage, the switching frequency of a switching element is varied in response to the secondary side output voltage level to control the resonance impedance of a primary side parallel resonance circuit and the continuity angle of the switching element compositely.

9 Claims, 10 Drawing Sheets

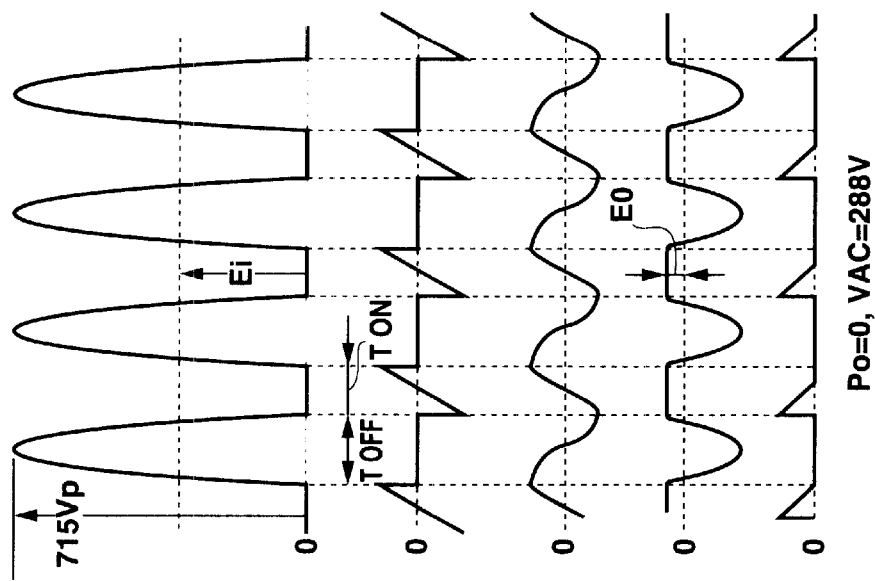
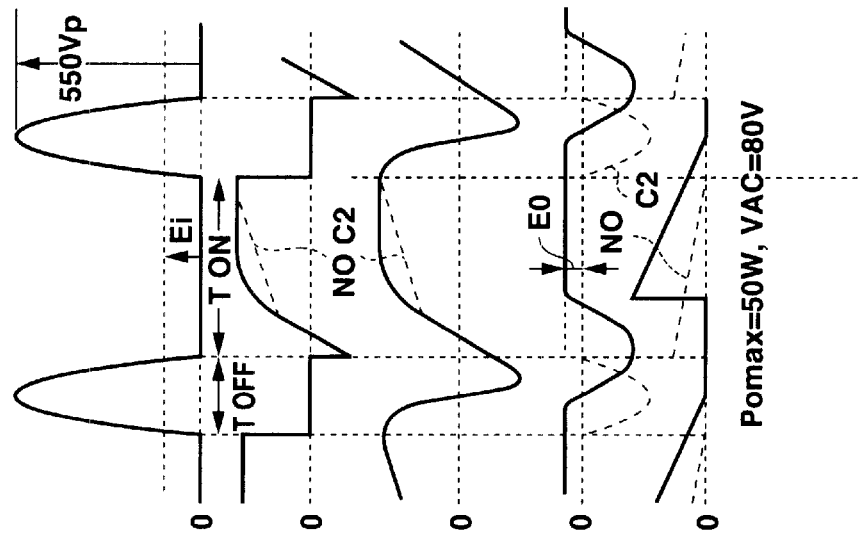

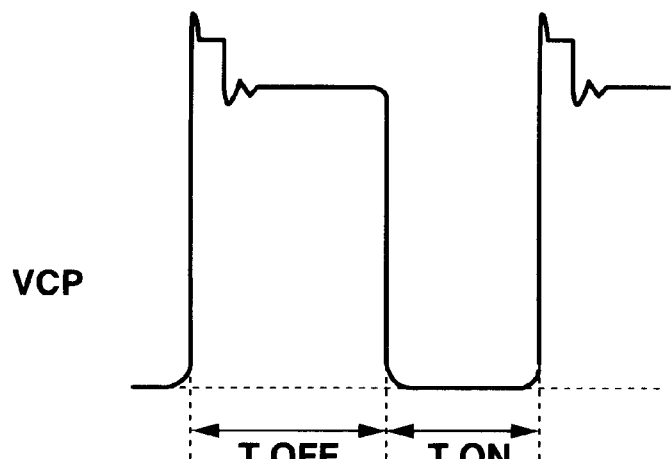
FIG.8A VCP
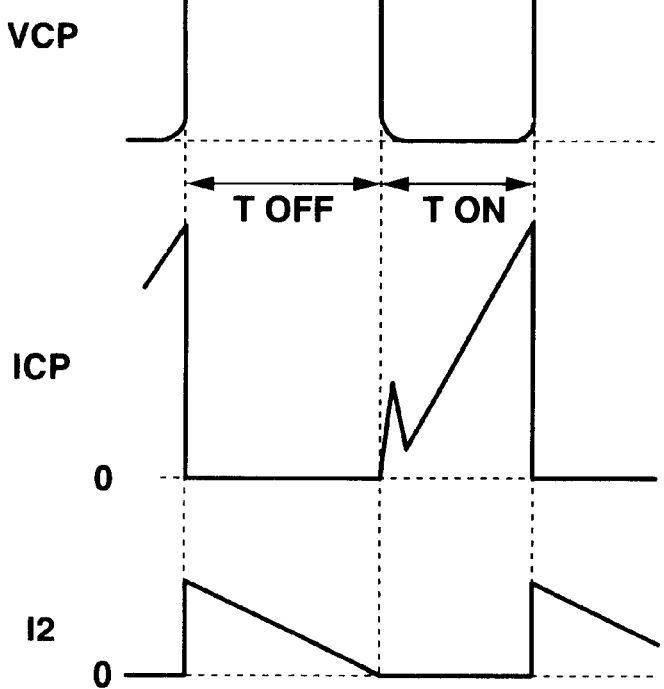
FIG.8B ICP
FIG.8C I2

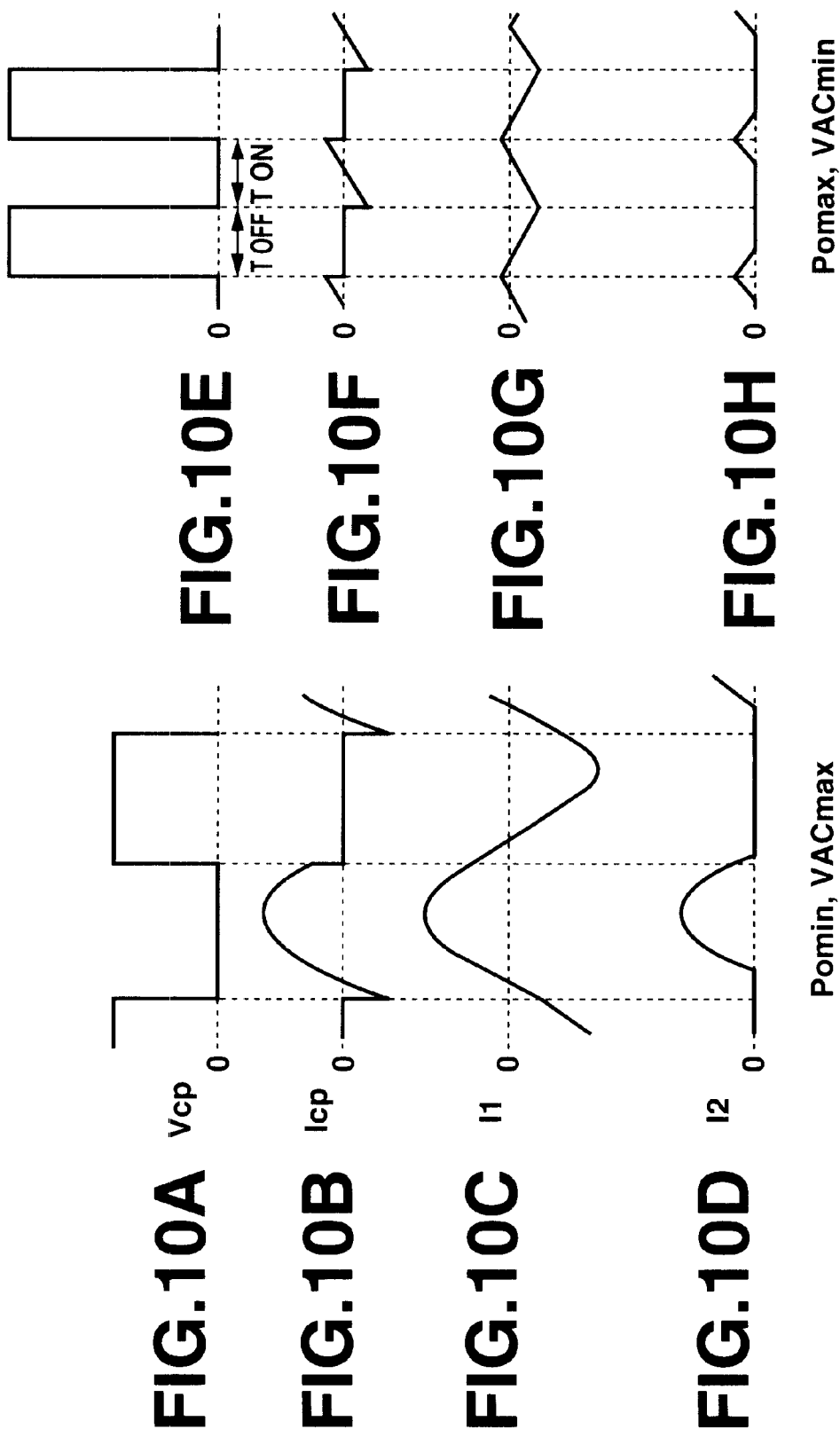

SWITCHING POWER SUPPLY CIRCUIT

TECHNICAL FIELD

This invention relates to a switching power supply circuit that can be incorporated as a power supply in various electronic devices.

BACKGROUND ART

A switching power supply circuit may adopt a switching converter such as a flyback converter or a forward converter. Since these switching converters use a rectangular waveform signal for a switching operation, a switching power supply circuit adopting such a converter is also called a hard switching power supply.

FIG. 7 depicts a hard switching power supply circuit 700 adopting a Ringing Choke Converter ("RCC") system. Power supply circuit 700 is used as a standby power supply provided separately from a main power supply and is constructed so as to satisfy, for example, a low load condition where the load power (Po) is 50 W or less or another condition where the load power Po is 0.5 W or less.

As shown in FIG. 7, power supply circuit 700 includes a converter transformer CVT having a driving winding NB, a primary winding N1 on a primary side, and a secondary winding N2 on a secondary side. Thus, power supply circuit 700 is divided into a primary side 710 and a secondary side 715.

Power supply circuit 700 includes a rectifier smoothing circuit 705 for receiving a commercial Alternating Current ("AC") power supply with an input AC voltage VAC and producing a Direct Current ("DC") input voltage Ei. Rectifier smoothing circuit 705 is a full-wave voltage-mulitplying rectifier circuit composed of a bridge rectifier circuit Di and a smoothing capacitor Ci. Rectifier smoothing circuit 705 produces rectified smoothed DC input voltage Ei that is substantially equal to AC input voltage VAC. Further, an inrush current limitation resistor Ri is interposed in a rectifier current path of rectifier smoothing circuit 705 in order to suppress any initial inrush current spike from flowing into smoothing capacitor Ci, for example, when power supply AC is initially provided to circuit 705.

A switching element Q1 receives and switches DC input voltage Ei to produce a switching output. Illustratively, a bipolar transistor is used for switching element Q1.

The collector of switching element Q1 is connected to a positive electrode terminal of smoothing capacitor Ci through a series connection to primary winding N1 of converter transformer CVT.

The base of switching element Q1 is connected to receive rectified smoothed voltage Ei through a starting resistor RS so that a base current may be supplied thereto upon starting. Further, a series circuit connection of a base current limiting resistor RB, a diode D4, and driving winding NB is connected to the base of switching element Q1. An end of driving winding NB is grounded. A capacitor CB is connected in parallel to diode D4. Base current limiting resistor RB, diode D4, driving winding NB, and capacitor CB cooperatively form a self-excited oscillation drive circuit which oscillates and drives switching element Q1 in a self-excited manner.

The emitter of switching element Q1 is connected to ground through a resistor R7.

Converter transformer CVT is provided to transmit a switching output obtained by primary side 710 of power supply circuit 700 to secondary side 715 and has primary winding N1 and secondary winding N2 wound thereon. Also, driving winding NB for self-excited oscillation described above is wound on the primary side of converter transformer CVT.

A half-wave rectifier circuit formed by a rectifier diode D01 and a smoothing capacitor C01 is connected to secondary winding N2 of converter transformer CVT and produces and outputs a secondary side DC output voltage E01. Secondary side DC output voltage E01 is supplied to a load (not shown) and further inputted as a detection voltage to a control circuit 7 for constant voltage control.

Control circuit 7 includes a photo-coupler PC to isolate, in DC, parts thereof on secondary side 715 from parts on primary side 710. On secondary side 715, control circuit 7 comprises a pair of resistors R3 and R4 that divide secondary side DC output voltage E01, and the divided voltage is inputted to a detection input of a detection element Q3. An end of detection element Q3 is connected to receive secondary side DC output voltage E01 through a series connection of a resistor R1 and a photo-diode PD of photo-coupler PC. The other end of detection element Q3 is grounded.

A series circuit connection of a capacitor C11 and a resistor R2 is connected in parallel to resistor R4. Another series circuit connection of a capacitor C12 and a resistor R5 is connected across a junction between resistors R4 and R3 and a junction between detection element Q3 and photo-diode PD.

On primary side 710, control circuit 7 includes a phototransistor PT of photo-coupler PC. A half-wave rectifier circuit formed by a diode D3 and a capacitor C3 for rectifying and smoothing an alternating voltage excited in driving winding NB is connected to the collector of phototransistor PT so that a low DC voltage obtained by the half-wave rectifier circuit (D3 and C3) may be supplied as operating power supply to phototransistor PT.

The emitter of phototransistor PT is connected to the base of a transistor Q4, which serves as an amplifier. A series circuit connection of a resistor R8 and a Zener diode ZD is inserted between the emitter of phototransistor PT and a junction between driving winding NB and diode D4.

The collector of transistor Q4 is connected to the base of switching element Q1, and the emitter of transistor Q4 is grounded.

The base of transistor Q4 is connected to the emitter of switching element Q1 through a parallel circuit connection of a resistor R6 and a capacitor C13, and is, thus, grounded through resistor R7.

A reset circuit 10 is formed by serially connecting diode DRS to a parallel circuit connection of a resistor RRS and a capacitor CRS. Reset circuit 10 is connected in parallel to primary winding N1.

A snubber circuit 11 includes a capacitor Csn serially connected to a resistor Rsn. The collector of switching element Q1 is grounded through snubber circuit 11.

Reset circuit 10 and snubber circuit 11 are required to suppress a spike voltage that appears upon turning off switching element Q1.

A switching operation is started by applying current to switching element Q1 through starting resistor RS, thereby turning on switching element Q1. When switching element Q1 is on, magnetic energy is stored into primary winding N1 of converter transformer CVT. When switching element Q1 is off, the magnetic energy stored in primary winding N1 is discharged to the secondary side of converter transformer CVT. This operation is repeated to produce an output voltage on the secondary side of converter transformer CVT.

Control circuit 7 varies the amount of current passing through detection element Q3 in response to secondary side DC output voltage E01. Photo coupler PC controllably varies the base current supplied to transistor Q4 in response to the amount of current flowing through detection element Q3, thereby varying the collector current of transistor Q4. Since the collector of transistor Q4 is connected to the base of switching element Q1, the base current (drive current amount) to flow from the self-excited oscillation drive circuit (resistor RB, diode D4, driving NB, and capacitor CB) to the base of switching element Q1 varies in accordance with the collector current of transistor Q4. Consequently, the on time of switching element Q1 is varied, and as a result, the switching frequency is controllably varied, thereby performing constant voltage control.

In power supply circuit 700 having the construction shown in FIG. 7, a constant voltage effect may be obtained by controlling a switching frequency (fs) to increase in response to a rise in AC input voltage VAC or a decrease in the load power Po. The range of control of switching frequency fs is set to a wide range of 25 KHz to 250 KHz because the control sensitivity is low.

The waveform diagrams in FIGS. 8A to 8C illustrate an operation of power supply circuit 700.

A voltage Vcp across switching element Q1 and resistor R7 (between the collector of switching element Q1 and ground) has a waveform such as the one shown in FIG. 8A. As shown by FIG. 8A, voltage Vcp exhibits a 0 level over a period TON when switching element Q1 is on, but exhibits a form of a rectangular pulse over a period TOFF when switching element Q1 is off As can be seen from the pulse waveform of voltage Vcp shown in FIG. 8A, a spike voltage is generated upon turning off switching element Q1 by a leakage inductance component of converter transformer CVT and a distributed capacity (electrostatic capacity) between windings N1,N2 and NB on converter transformer CVT. Reset circuit 10 and snubber circuit 11 are provided in order to suppress a portion of the waveform of voltage Vcp where the spike voltage appears.

A collector current Icp flows into the collector of switching element Q1 in response to a switching operation of switching element Q1. Collector current Icp flows in a waveform as shown in FIG. 8B during period TON.

A rectified current 12 flows from secondary winding N2 into rectifier diode D01 during period TOFF when switching element Q1 is off, corresponding to the switching operation of an RCC.

The switching converters (flyback or forward) used in a hard switching power supply, such as circuit 700, are limited in power conversion efficiency and the amount of switching noise they can suppress. Thus, various soft switching power supplies, which employ resonance type switching converters, may be used. A resonance type switching converter is advantageous because it can readily obtain a high power conversion efficiency. Such a converter also generates lower noise than a converter used in a hard switching power supply because the waveform of a switching operation of a resonance type converter is a sine waveform. The resonance type is also advantageous because it can be formed from a comparatively small number of parts.

A switching power supply circuit 900 that satisfies the low load condition of having a load power Po of 50 W or less or 0.5 W or less is shown in FIG. 9.

For simplicity, like portions in FIG. 9 to those in FIG. 7 are denoted by similar reference numerals and their description is omitted.

Referring to FIG. 9, power supply circuit 900 includes a self-excited converter of the current resonance type wherein a rectified smoothed voltage Ei is used as an operating power supply.

The switching converter of power supply circuit 900 includes a pair of switching elements Q1 and Q2 connected in a half bridge connection, as shown in FIG. 9, and interposed between the positive electrode side junction of a smoothing capacitor Ci and ground.

Starting resistors RS1 and RS2 Are interposed between the collector and the base of switching elements Q1 and Q2, respectively. A pair of clamp diodes DD1 and DD2 are interposed between the base and the emitter of switching elements Q1 and Q2, respectively.

A series circuit connection of a resonance capacitor CB1, a base current limiting resistor RB1, and a driving winding NB1 (having an inductance LB1) is interposed between the base of switching element Q1 and the collector of switching element Q2, thus cooperatively forming a series resonance circuit for self-excited oscillation and determining the switching frequency of switching element Q1.

Similarly, another series circuit connection of a resonance capacitor CB2, a base current limiting resistor RB2, and a driving winding NB2 (having an inductance LB2) is interposed between the base of switching element Q2 and ground, forming a series resonance circuit for self-excited oscillation and determining the switching frequency of switching element Q2.

Partial resonance capacitors CC1 and CC2 are connected between the collector and the emitter of switching elements Q1 and Q2, respectively. Partial resonance capacitors CC1 and CC2 are provided in order to absorb switching noise of switching elements Q1 and Q2, respectively. They further act to obtain a zero voltage switching operation upon turning off switching elements Q1 and Q2, respectively, in accordance with the switching frequencies which are controllably varied by a constant voltage controlling operation performed in such a manner as hereinafter described. The operation reduces the switching loss.

A drive transformer PRT (Power Regulating Transformer) is provided to drive switching elements Q1 and Q2 and controllably vary the switching frequencies to perform constant voltage control. Drive transformer PRT in power supply circuit 900 is an orthogonal saturable reactor on which driving windings NB1 and NB2 and a resonance current detection winding ND are wound, and on which a control winding NC is wound in a direction orthogonal to windings NB1, NB2, and ND.

An end of driving winding NB1 of drive transformer PRT is connected to the base of switching element Q1 through a series connection to resonance capacitor CB1 and base current limiting resistor RB1, and the other end of driving winding NB1 is connected to the emitter of switching element Q1. An end of driving winding NB2 is connected to ground, and the other end of driving winding NB2 is connected to the base of switching element Q2 through a series connection to resonance capacitor CB2 and base current limiting resistor RB2. Driving winding NB1 and driving winding NB2 are wound such that they may generate voltages having opposite polarities.

An insulating converter transformer PIT (Power Isolation Transformer) transmits switching outputs of switching elements Q1 and Q2 to its secondary side. In this instance, an end of primary winding N1 of insulating converter transformer PIT is connected to a junction (switching output point) between the emitter of switching element Q1 and the collector of switching element Q2 through resonance current detection winding ND. The other end of primary winding N1 is grounded through a series resonance capacitor C1 so that a switching output signal may be obtained. Thus, a series resonance circuit for a current resonance type switching converter operation is formed from a capacitance of series resonance capacitor C1 and a leakage inductance component of insulating converter transformer PIT including primary winding N1 (series resonance winding).

On the secondary side of insulating converter transformer PIT, an alternating voltage with a switching period is excited in secondary winding N2 by the switching output signal supplied to primary winding N1. A tap is provided for secondary winding N2, and rectifier diodes D01, D02 and D03, and smoothing capacitors C01 and C02 are connected as shown in FIG. 9. A full-wave rectifier circuit is formed by rectifier diodes D01 and D02 and smoothing capacitor C01, and a half-wave rectifier circuit is formed by rectifier diode D03 and smoothing capacitor C02.

The full-wave rectifier circuit formed by rectifier diodes D01 and D02 and smoothing capacitor C01 performs a full-wave rectification operation to produce a DC output voltage E01 and supplies electric power to a load (not shown) in the next stage. DC output voltage E01 is inputted also to a control circuit 9 and utilized as a detection voltage by control circuit 9. Further, for protecting from short-circuiting the load, a fuse, for example, an integrated circuit ("IC")link, IL is interposed between DC output voltage E01 and the load.

Control circuit 9 supplies a DC current, whose level is varied, for example, in response to the level of secondary side DC output voltage E01, as a control current for controlling winding NC of drive transformer PRT to perform constant voltage control in such a manner as hereinafter described.

Control circuit 9 includes a pair of resistors R3 and R4, by which secondary side DC output voltage E01 is divided. The divided voltage is inputted to a detection element Q3. The cathode of detection element Q3 is connected to the positive electrode of smoothing capacitor C02 through a series connection to control winding NC, and the anode of detection element Q3 is grounded. A series circuit connection of a capacitor C12 and a resistor R5 is interposed between the positive electrode of smoothing capacitor C01 and a junction between resistors R3 and R4. Another series circuit connection of a capacitor C11 and a resistor R2 is interposed between the cathode of detection element Q3 and the junction between resistors R3 and R4.

In a switching operation of power supply circuit 900, starting current is supplied to the bases of switching elements Q1 and Q2 through starting resistors RS1 and RS2, respectively, when AC power supply AC is first provided. For example, if switching element Q1 is switched on first, then switching element Q2 is controlled so that it is switched off. Then, as an output of switching element Q1, a resonance current I1 flows through resonance current detection winding ND, primary winding N1, and series resonance capacitor C1. Switching elements are controlled so that, when resonance current I1 decreases to zero, switching element Q2 is switched on and switching element Q1 is switched off Then, resonance current I1 flows in the reverse direction through switching element Q2. Thereafter, a self-excited switching operation, wherein switching elements Q1 and Q2 are alternately switched on, is performed.

As switching elements Q1 and Q2 alternately repeat on-off operations using the terminal voltage of smoothing capacitor Ci as an operating power supply, drive current having a waveform proximate to a resonance current waveform is supplied to primary winding N1 of insulating converter transformer PIT while an alternating output is obtained at secondary winding N2.

The constant voltage control by drive transformer PRT is performed in the following manner.

Control circuit 9 controls the level of a control current flowing through control winding NC to increase in response to a rise in secondary side DC output voltage E01. While drive transformer PRT is inclined to approach a saturation condition by the influence of the variation of magnetic flux generated in drive transformer PRT and thus dropping the inductance of driving windings NB1 and NB2, the condition of the self-excited oscillation circuits is varied by the control current so that the switching frequency may be raised.

While the switching frequency in power supply circuit 900 is set in a frequency range higher than the resonance frequency of the series resonance circuit of series resonance capacitor C1 and primary winding N1 (upper side control), if the switching frequency rises as described above, then the switching frequency is spaced away from the resonance frequency of the series resonance circuit. Consequently, the resonance impedance of the series resonance circuit with respect to the switching output increases.

As the resonance impedance increases in this manner, the drive current to be supplied to primary winding N1 of the primary side series resonance circuit is suppressed. As a result, the secondary side output voltage E01 is suppressed, and consequently, constant voltage control is achieved (switching frequency control system).

FIGS. 10A to 10H are waveform diagrams illustrating operations of power supply circuit 900. Particularly, FIGS. 10A to 10D show operation waveforms of different portions of power supply circuit 900 when the load power Po is at a minimum load power (Pomin) and AC input voltage VAC is at a maximum AC input power (VAC max), and FIGS. 10E to 10H show operation waveforms of the same portions as those of FIGS. 10A to 10D when the load power Po is at a maximum load power (Pomax) and AC input voltage VAC is at a minimum AC input voltage (VACmin).

As switching element Q2 performs a switching operation, voltage Vcp, obtained between the collector and the emitter of switching element Q2, has a waveform which exhibits the zero level during a period TON within which switching element Q2 is on, but which exhibits a pulse of a rectangular waveform during a period TOFF within which switching element Q2 is off, as shown in FIGS. 10A and 10E. Further, as can be recognized from comparison of voltages Vcp shown in FIGS. 10A and 10E, the switching frequency is controlled by the constant voltage control operation described above such that it is higher when the load power Po is at minimum load power Pomin and AC input voltage VAC is at maximum AC input voltage VACmax than when the load power Po is at maximum load power Pomax and AC input voltage VAC is at minimum AC input power VACmin.

In this instance, collector current Icp which flows to the collector of switching element Q2 exhibits a waveform such that it flows to the collector of switching element Q2 during period TON but has the zero level during period TOFF, as shown in FIGS. 10B and 10F. Meanwhile, switching output current (primary side series resonance current) I1 which flows through primary winding N1 and series resonance capacitor C1 exhibits a current waveform substantially corresponding to the switching frequency, as shown in FIGS. 10C and 10G. As shown in FIGS. 10B and 10C, collector current Icp and primary side series resonance current I1 have waveforms of a sine wave corresponding to the current resonance type when the switching frequency is low. As the switching frequency increases, the waveforms of collector current Icp and primary side series resonance current I1 approach waveforms of a saw-tooth-wave, as shown in FIGS. 10F and 10G. It is noted that switching element Q2 provides waveforms having phases shifted by 180 degrees from the waveforms shown in FIGS. 10A to 10C and 10E to 10G.

On the other hand, on secondary side 915, rectifier diode D02 is rendered conducting substantially at a timing of period TON within which switching element Q2 is on. Consequently, rectification current I2 which flows from secondary winding N2 to rectifier diode D02 exhibits a waveform as shown in FIG. 10D or 10H. In addition, operation of rectifier diode D01 provides a waveform having a phase shift of 180 degrees from the waveform shown in FIG. 10D or 10H.

With power supply circuit 700 of the RCC system, the switching frequency fs is controllably varied as a constant voltage control operation as described above. However, since the control sensitivity for the constant voltage control is low, the range of variation of the switching frequency fs is comparatively wide from 25 KHz to 250 KHz as described hereinabove. Therefore, when the load power Po becomes minimum load power Pomin and the switching frequency fs becomes low, the switching loss increases and the power conversion efficiency drops significantly. Further, the power loss is increased by reset circuit 10 and snubber circuit 11, which are connected in order to suppress a spike voltage upon turning off a switching element.

Further, as seen from FIG. 8A, the alternating voltage which is generated by a switching operation is a pulse signal of a rectangular waveform, and switching noise is generated upon turning on and upon turning off. Therefore, in order to allow power supply circuit 700 of the RCC system to be practically used as a power supply, for example, for a video apparatus, the load power condition is at approximately 1 W or less, while the application of power supply circuit 700 of the RCC system is limited to an application as a standby power supply, whose load power Po is approximately 0.5 W or less.

On the other hand, in switching power supply circuit 900, a current resonance converter by a half-bridge connection wherein capacitors for partial resonance are connected between the collector and the emitter of two switching elements is provided in order to realize a zero volt (zero voltage) switching operation upon turning off of a switching element. Hence, switching power supply circuit 900 generates less noise than power supply circuit 700 and has a higher power conversion efficiency.

However, switching power supply circuit 900 does not overcome all of the shortcomings of circuit 700, namely, the invalid power increases when the load power Po approaches minimum load power Pomin and the switching frequency fs drops, and the power conversion efficiency drops significantly to, for example, approximately 60%.

Further, since power supply circuit 900 adopts a construction of a self-excited current resonance converter wherein two switching elements are connected in a half bridge connection, it requires formation of a switching circuit system including two self-excited oscillation drive circuits. Consequently, the number of components increases as much, giving rise to a limitation on the reduction in size and weight of a power supply circuit board.

Furthermore, power supply circuit 900 is not provided with a load short-circuiting protection function. In particular, upon short-circuiting of the load, the control current (DC current amount) flowing through control winding NC of drive transformer PRT is reduced substantially to zero. Consequently, the switching frequency fs decreases almost to a lower limit of the control range, and also primary side series resonance current I1 flowing through the primary side series resonance circuit is inclined to increase. In this state, heat generation by switching loss at switching elements Q1 and Q2 increases to a level which cannot be ignored, and according to circumstances, there is the possibility that thermorunaway may occur and destroy switching elements Q1 and Q2. Therefore, for example, as shown in FIG. 9, it is necessary to interpose fuse IL to cut secondary side DC output voltage E01 and the load from each other when short-circuiting occurs with the load. Fuse IL also increases the size of a circuit board and decreases power conversion efficiency.

DISCLOSURE OF THE INVENTION

It is an object of the present invention to provide a switching power supply circuit which is small, lightweight, and highly efficient in power conversion while satisfying a comparatively low load condition such that the load power Po is, for example, 50 W or less.

In order to attain the object described above, a switching power supply circuit according to the present invention comprises a rectifier smoothing circuit for receiving a commercial AC power supply, producing a rectified smoothed voltage of a level equal to a level of the commercial AC power supply, and outputting the rectified smoothed voltage as a DC input voltage; an insulating converter transformer including a core having no gap formed therein so that a desirable coupling efficiency may be obtained, and a primary winding and a secondary winding wound on the core with such polarities that an additive operation mode is provided; a switching circuit including a switching element for switching the DC input voltage on and off so as to be outputted to the primary winding of the insulating converter transformer; a primary side parallel resonance circuit formed from a leakage inductance component of the primary winding of the insulating converter transformer and a capacitance of a parallel resonance capacitor for operating a voltage resonance type switching element; a DC output voltage production circuit for receiving an alternating voltage obtained at the secondary winding of the insulating converter transformer and performing a half-wave rectification operation for the alternating voltage to produce a secondary side DC output voltage substantially equal to the level of the DC input voltage; and a constant voltage control circuit for varying a switching frequency of the switching element in response to a level of the secondary side DC output voltage to control a resonance impedance of the primary side parallel resonance circuit and a continuity angle of the switching element so as to perform constant voltage control of the secondary side output voltage.

Preferably, in order to satisfy a load power condition higher than a particular level, a secondary side parallel resonance capacitor is connected in parallel to the secondary winding of the insulating converter transformer so that a secondary side parallel resonance circuit is formed from a leakage inductance component of the secondary winding of the insulating converter transformer and a capacitance of the secondary side parallel resonance capacitor. For satisfying a load power condition less than a particular level, the secondary side parallel resonance capacitor is omitted.

Preferably, the switching circuit includes a series resonance circuit formed from a series connection of at least a driving winding and a resonance capacitor. The switching power supply circuit further comprises a self-excited oscillation drive circuit for driving the switching element in a self-excited manner in response to a resonance output of the series resonance circuit. The constant voltage control circuit includes an orthogonal control transformer as a saturable reactor on which the detection winding and the driving winding connected in series to the primary winding of the insulating converter transformer and a control winding whose winding direction is orthogonal to that of the detection winding and the driving winding are wound. The constant voltage control circuit supplies a control current, which varies in response to a level of the secondary side DC output voltage, to the control winding to vary an inductance of the driving winding to controllably vary the switching frequency.

Preferably, the detection winding and the driving winding are formed from the same type of material as used for the control winding.

The switching power supply circuit may be constructed such that the switching circuit includes a separately excited drive circuit for driving the switching element in a separately excited manner, and the constant voltage circuit controllably varies an on period of the switching element while keeping an off period of the switching element fixed in response to a level of the secondary side DC output voltage to controllably vary the switching frequency.

The switching element of the switching circuit may be formed from a Darlington circuit which includes a bipolar transistor, a MOS field effect transistor, an insulated gate bipolar transistor or an electrostatic induction thyristor.

In the switching power supply circuit, a voltage resonance converter is provided on the primary side, and the insulating converter transformer has a loose coupling. On the secondary side, a secondary side DC output voltage is produced by a half-wave rectifier circuit to supply power to a load. Further, in the construction for constant voltage control, the resonance impedance of the primary side parallel resonance circuit and the continuity angle of the switching element are controlled simultaneously by varying the switching frequency in response to the secondary side DC output level. Thus, augmentation of the control sensitivity is achieved by such composite control operation.

More particularly, where the switching power supply circuit is formed, for example, so as to satisfy the comparatively low load condition of having a load power of approximately 50 W or less, it includes a voltage resonance switching converter provided on the primary side and an insulating converter transformer, which includes a primary winding and a secondary winding that are wound such that the mutual inductance between them may provide an additive operation mode (+M; forward system). Further, a half-wave rectifier circuit is provided on the secondary side so that a secondary side DC output voltage may be obtained from an alternating voltage (excited voltage) obtained at the secondary winding by a half-wave rectification operation of the half-wave rectifier circuit in the additive operation mode.

Further, as a construction for constant voltage control for stabilizing the secondary output voltage, the switching frequency of the primary side is varied in response to the secondary side output voltage level thereby compositely controlling the resonance impedance of the power supply circuit and the continuity angle of the switching element.

From the construction described above, the following advantages can be achieved.

Since the switching converter of the switching power supply circuit is of the voltage resonance type, a switching operation which produces less noise than a switching power supply of the RCC system is realized. Consequently, as opposed to a switching power supply of the RCC system, a power supply circuit according to the present invention does not require a reset circuit or a snubber circuit to suppress a spike voltage. Accordingly, when compared with a switching power supply of the RCC type, the switching power supply circuit of the present invention achieves significant improvement in power conversion efficiency. The switching power supply circuit of the present invention also exhibits significant improvement in power conversion efficiency, when operating with maximum load power, over a current resonance converter, which is considered to have a comparatively high power conversion efficiency from its characteristics.

A current resonance converter is formed from a half bridge connection of two switching elements. Since the switching power supply circuit of the present invention can be constructed such that substantially equal load power is obtained using a single switching element because it is a voltage resonance converter, the number of parts is decreased as much, and reduction in size, weight, and cost of the circuit can be promoted.

Further, since the switching power supply circuit of the present invention is constructed such that it varies the switching frequency to control both the resonance impedance for the switching output and the continuity angle of the switching element, thereby performing constant voltage control, the control sensitivity is improved and the controllable range is expanded. Consequently, stabilization of the secondary side output voltage can be achieved over a narrower control range of the switching frequency. Such reduction of the control range of the switching frequency contributes to reduction of the number of turns that need to be wound on the transformer forming the power supply circuit and miniaturization in size of various components and devices.

Where a self-excited circuit system for driving the switching element is provided in the constant voltage control circuit, an orthogonal control transformer on which a control winding, a driving winding, and a detection winding are wound is provided. In this instance, if the detection winding and the driving winding are formed from the same type of material as used for the control winding, then production efficiency of the orthogonal control transformer is improved.

Where a secondary side parallel resonance capacitor is connected in parallel to the secondary winding to form a parallel resonance circuit, the half-wave rectifier circuit of the secondary side receives an alternating voltage, which is a resonance output of the parallel resonance circuit, to obtain a secondary side DC output voltage. Consequently, the load power increases. In other words, the switching power supply circuit can cope with a load power higher than a particular level by merely inserting the secondary side parallel resonance capacitor. Where the switching power supply circuit is applied to an application such as, for example, a standby power supply and is required only to cope with a load power lower than the particular level, the secondary side parallel resonance capacitor may be omitted. Thus, adjustments according to a required load power condition can be performed simply by inserting or removing the secondary side parallel resonance capacitor.

Further, since the parallel resonance circuit is provided on the secondary side, the parallel resonance voltage is obtained on the secondary side even when short-circuiting of the load occurs. Thus, the switching frequency does not drop even upon load short-circuiting. In short, the switching power supply circuit has a protection function against load short-circuiting. Accordingly, with the switching power supply circuit of the present invention, the necessity to insert an IC link fuse or the like in the secondary side output is eliminated. Consequently, improvement in power conversion efficiency and reduction in size and weight of the circuit can be promoted.

In the switching power supply circuit, the switching element can be formed from a Darlington circuit which includes a bipolar transistor, a MOS field effect transistor, an insulated gate bipolar transistor, or an electrostatic induction thyristor. Hence, the power conversion efficiency can be further improved over, for example, a single bipolar transistor switching element.

In this manner, according to the present invention, reduction in cost, size, and weight, and improvement of characteristics such as power conversion efficiency are promoted for a power supply circuit that includes a voltage resonance converter on the primary side and is ready for a comparatively low load.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

For a more complete understanding of the invention, reference is made to the following description and accompanying drawing(s), in which:

FIGS. 5A to 5J are waveform diagrams illustrating operation of several components of the power supply circuit of FIG. 1;

FIGS. 8A to 8C are waveform diagrams illustrating operations of several components of the power supply circuit of FIG. 7;

FIGS. 10A to 10H are waveform diagrams illustrating operations of several components of the power supply circuit of FIG. 9.

BEST MODE FOR CARRYING OUT THE INVENTION

Figure 1:
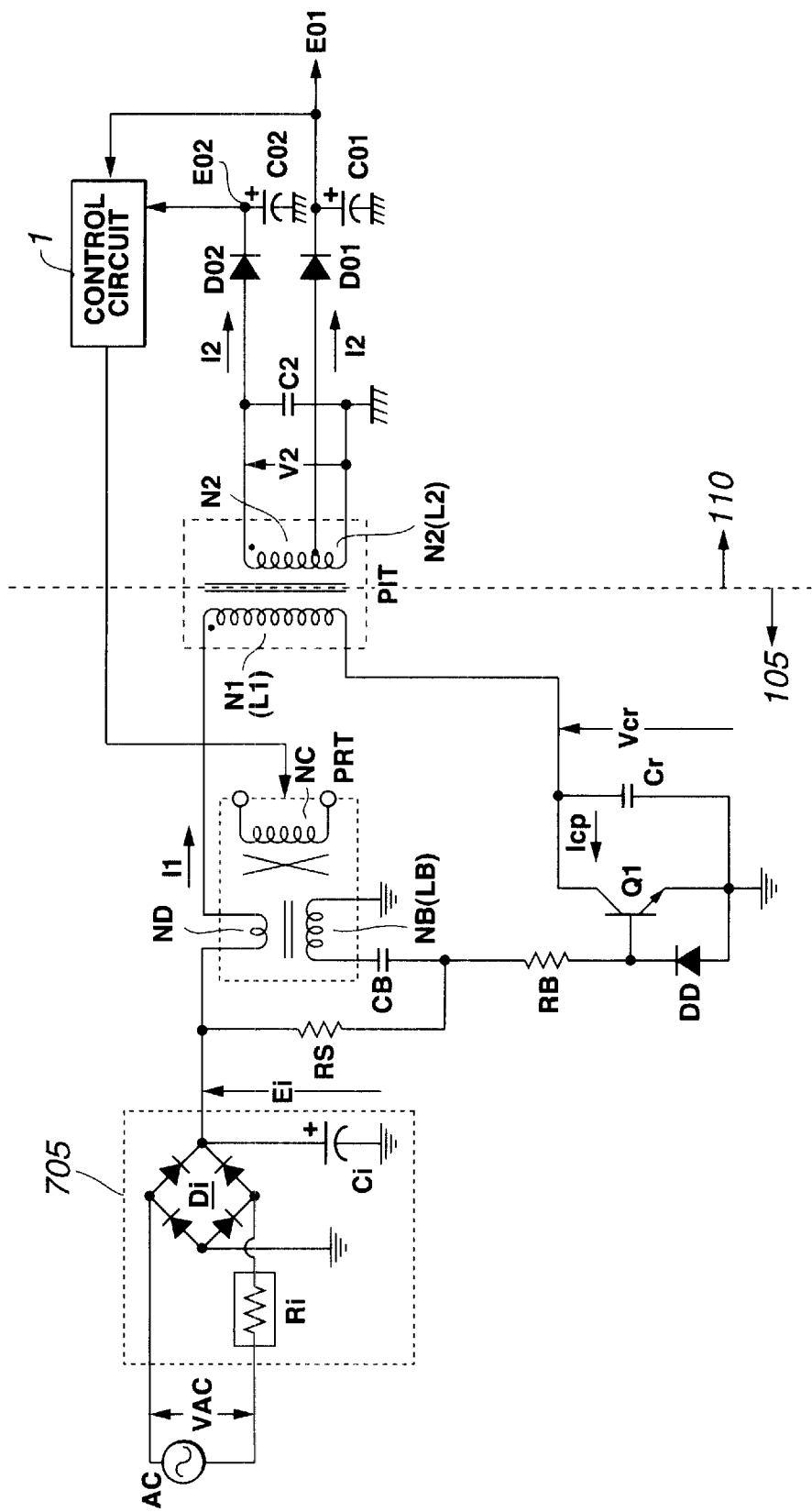
FIG. 1 is a circuit diagram showing a construction of a power supply circuit to which the present invention is applied.

FIG. 1 shows a construction of a switching power supply circuit 100 in accordance with the present invention. As shown in FIG. 1, power supply circuit 100 includes several components in common with those of power supply circuits 700 and 900. It is noted that description of such common components is omitted herein to avoid redundancy.

Referring to FIG. 1, power supply circuit 100 includes, on its primary side 105, a self-excited switching converter of the voltage resonance type which includes a switching element Q1. A bipolar transistor (BJT: junction transistor) having a high voltage withstanding property is adopted for switching element Q1.

The base of switching element Q1 is connected to the positive electrode of a smoothing capacitor Ci (rectified smoothed voltage Ei) through a series connection to a base current limiting resistor RB and a starting resistor RS so that base current may be obtained from a rectifier smoothing line upon starting. Further, a resonance circuit for self-excited oscillation driving (self-excited oscillation drive circuit) is connected between the base of switching element Q1 and ground and is formed from a series circuit connection including base current limiting resistor RB, a resonance capacitor CB, and a detection driving winding NB. Switching element Q1 is driven for switching with drive current applied to the base thereof from the self-excited oscillation drive circuit after it is started with a starting current.

A clamp diode DD is interposed between the base of switching element Q and the negative electrode (primary side ground) of smoothing capacitors Ci and forms a path for damper current which flows when switching element Q1 is off. The collector of switching element Q1 is connected to an end of a primary winding N1 of an insulating converter transformer PIT, and the emitter of switching element Q1 is grounded. Consequently, a switching output of switching element Q1 is transmitted to primary winding N1.

A parallel resonance capacitor Cr is connected in parallel between the collector and the emitter of switching element Q1. Parallel resonance capacitor Cr forms, based on a capacitance of parallel resonance capacitor Cr and a leakage inductance L1 of primary winding N1 of insulating converter transformer PIT, a primary side parallel resonance circuit for voltage resonance switching of the switching element Q1. Although detailed description is omitted here, when switching element Q1 is off, voltage resonance operation is obtained by the action of the parallel resonance circuit which causes voltage Vcr across resonance capacitor Cr to actually exhibit a pulse wave of a sine waveform.

An orthogonal control transformer PRT, as shown in FIG. 1, is a saturable reactor including a detection winding ND, driving winding NB, and a control winding NC.

Figure 2:
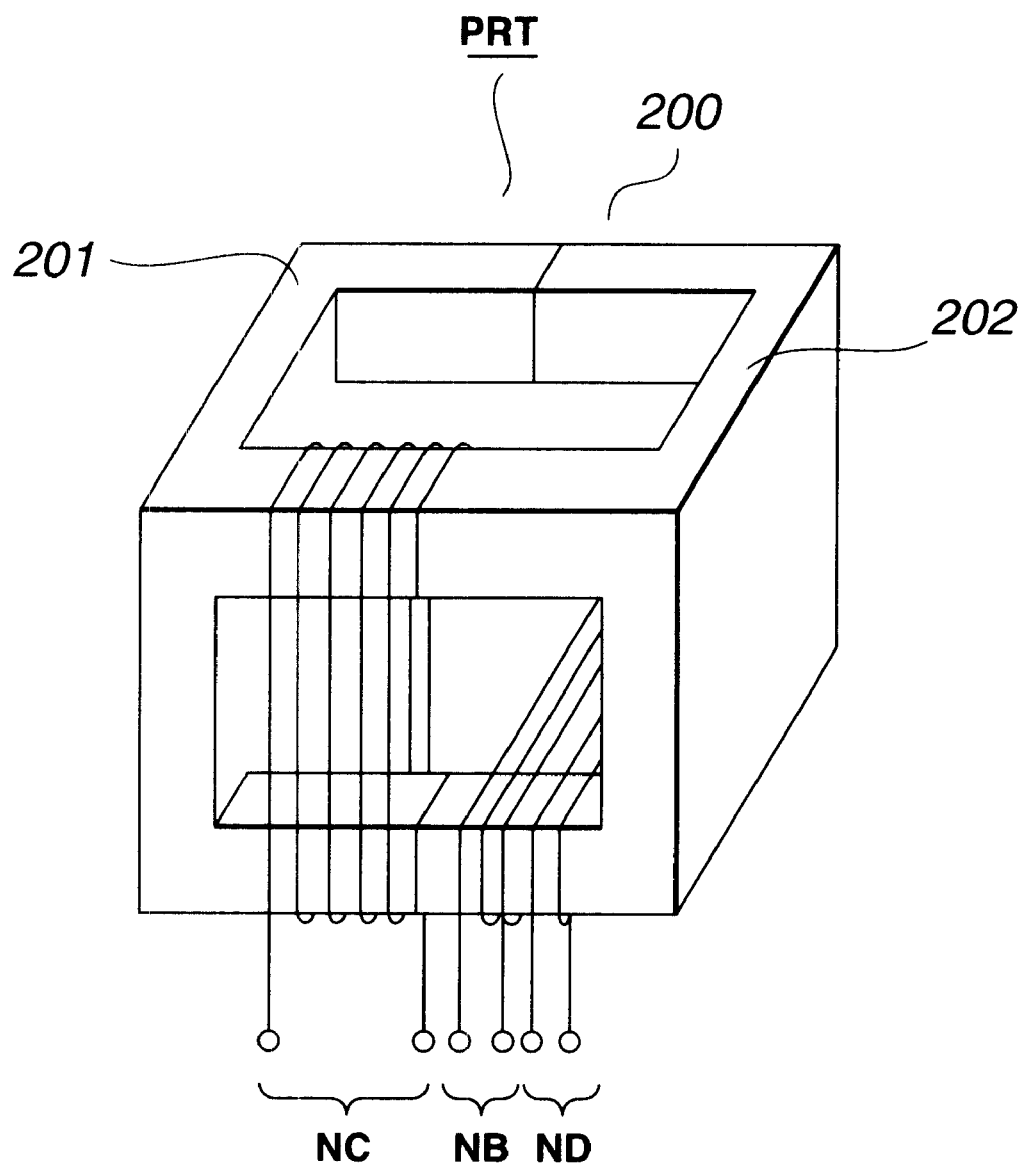
FIG. 2 is a perspective view showing a structure of an orthogonal control transformer provided in the power supply circuit of FIG. 1.

As shown in FIG. 2, orthogonal control transformer PRT has a three dimensional core 200 that is formed by joining two double channel-shaped cores 201 and 202, each having four magnetic legs, to each other at the ends of the magnetic legs thereof. Detection winding ND and driving winding NB are wound in the same winding direction around two predetermined magnetic legs of three dimensional core 200, and control winding NC is wound in a direction orthogonal to that of detection winding ND and driving winding NB.

In this instance, detection winding ND of orthogonal control transformer PRT is interposed in series between the positive electrode of smoothing capacitor Ci and primary winding N1 of insulating converter transformer PIT so that switching output of switching element Q1 is transmitted to detection winding ND through primary winding N1. In orthogonal control transformer PRT, driving winding NB is excited by a switching output obtained at detection winding ND so that an alternating voltage is generated in driving winding NB. The alternating voltage is outputted as a source of a drive voltage to the self-excited oscillation drive circuit.

Figure 9:
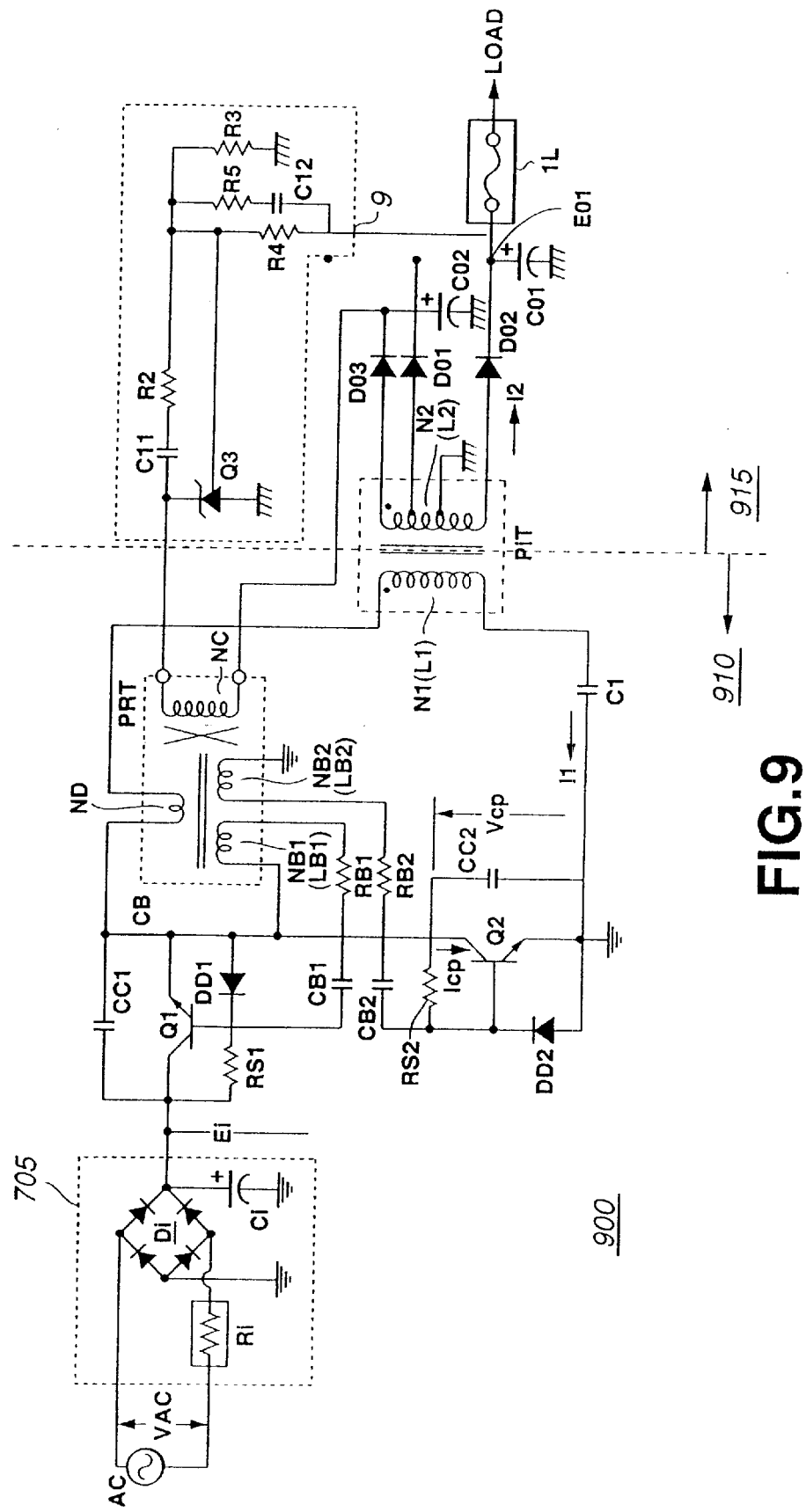
FIG. 9 is a circuit diagram showing a construction of another conventional power supply circuit.

A control circuit 1 shown in FIG. 1 operates to vary the level of a control current (DC current) supplied to control winding NC in response to the level of a secondary side DC output voltage E01 inputted thereto. It is noted that control circuit 1 may have such an internal construction, for example, as that of control circuit 9 described hereinabove with reference to FIG. 9.

As the level of the control current (DC current) to be supplied to control winding NC is varied in response to a variation of the secondary side DC output voltage level by the operation of control circuit 1, inductance LB of driving winding NB wound on orthogonal control transformer PRT is controllably varied. Consequently, the resonance condition of the series resonance circuit in the self-excited oscillation drive circuit for switching element Q1, including inductance LB of driving winding NB, varies. This is an operation of varying the switching frequency of switching element Q1 as hereinafter described with reference to FIG. 5, and this operation acts to stabilize secondary side DC output voltage E01.

Figure 3:
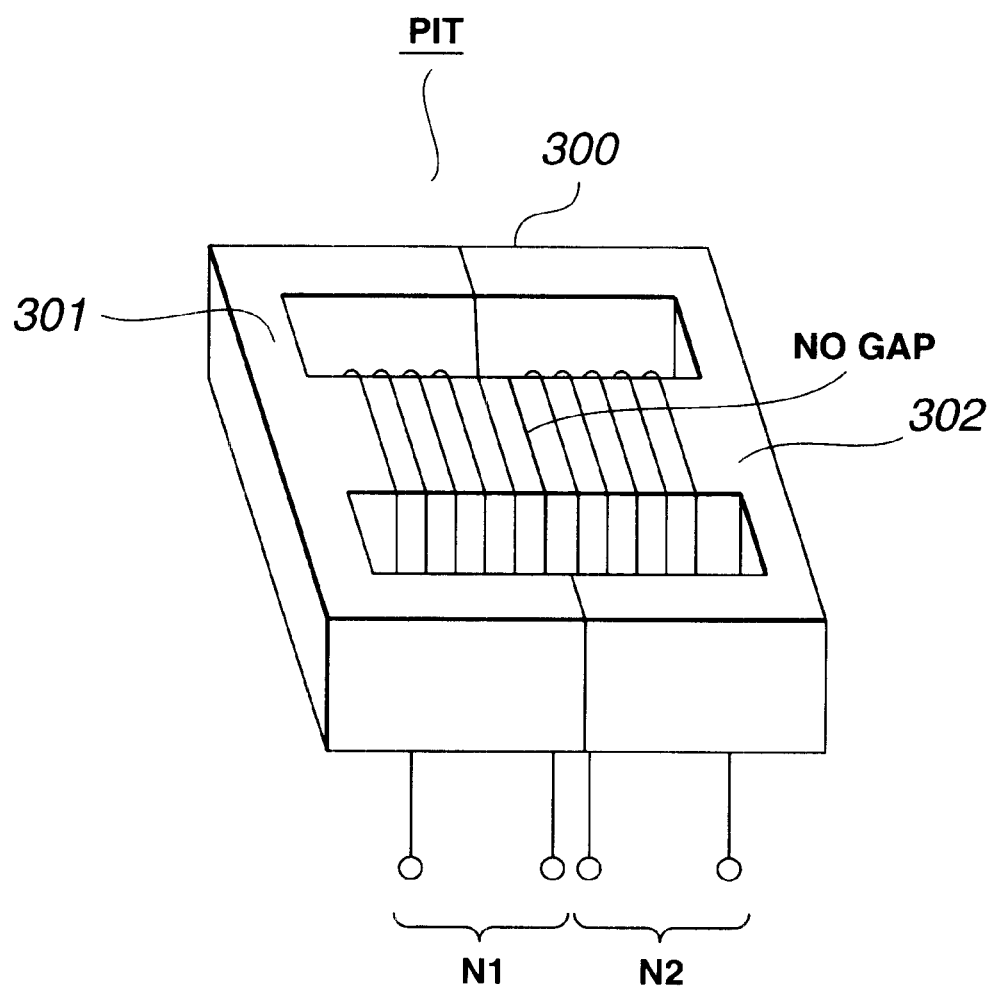
FIG. 3 is a perspective view showing a structure of an insulating converter transformer provided in the power supply circuit of FIG. 1.

Insulating converter transformer PIT of power supply circuit 100 is shown in FIG. 3. As illustrated in FIG. 3, insulating converter transformer PIT includes an EE-shaped core 300 formed from two E-shaped cores 301 and 302 made of a ferrite material and combined such that magnetic poles thereof are opposed to each other. Primary winding N1 and secondary winding N2(and another secondary winding N2A) are wound separately from each other on the central magnetic legs of EE-shaped core 300 using a split bobbin whose winding portion is split for a primary side and a secondary side. According to an embodiment, no gap is formed between the central magnetic legs of E-shaped cores 301 and 302. Consequently, such a loose coupling condition that a required saturation condition is obtained is established. The coupling coefficient k is, for example, k=0.90.

In this instance, in insulating converter transformer PIT, an alternating voltage is excited in secondary winding N2 in response to a switching output transmitted to primary winding N1.

In insulating converter transformer PIT of power supply circuit 100, a tap is provided for secondary winding N2 as shown in FIG. 1, and the anode of a rectifier diode D01 is connected in series to the tap output of secondary winding N2. The cathode of rectifier diode D01 is connected to the positive electrode of a smoothing capacitor C01, and the negative electrode of smoothing capacitor C01 is connected to ground. In short, rectifier diode D01 and smoothing capacitor C01 form a half-wave rectifier circuit that receives an alternating voltage obtained from the tap output of secondary winding N2 and performs half-wave rectification for the alternating voltage to obtain secondary side DC output voltage E01. Secondary side DC output voltage E01 is supplied to a load (not shown) and also inputted as the detection voltage to control circuit 1 described hereinabove.

Further, the anode of rectifier diode D02 is connected to a winding starting end of secondary winding N2 while the cathode of rectifier diode D02 is connected to the positive electrode of smoothing capacitor C02 thereby forming a half-wave rectifier circuit composed of rectifier diode D01 and smoothing capacitor C01. The half-wave rectifier circuit formed by rectifier diode D01 and smoothing capacitor C01 produces another secondary side DC output voltage E02 and supplies it as an operating power supply to control circuit 1.

In insulating converter transformer PIT shown in FIG. 3, a mutual inductance M between inductance L1 of primary winding N1 and inductance L2 of secondary winding N2 may have a value +M (additive mode: forward system) or another value −M (subtractive mode: flyback system) depending upon the relationship between the polarities (winding directions) of primary winding N1 and secondary winding N2 and the connection of rectifier diodes D01 and D02.

Figure 4A:
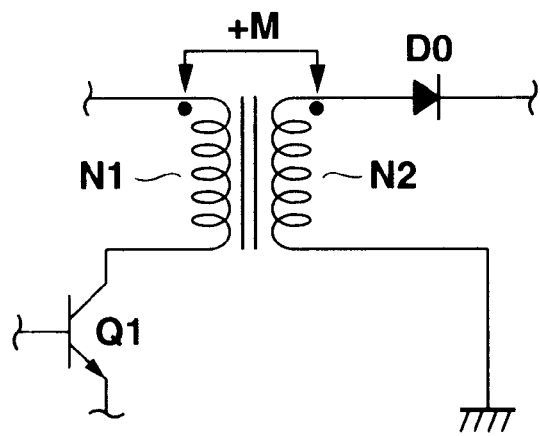
FIGS. 4A and 4B are circuit diagrams illustrating operations of the insulating converter transformer shown in FIG. 3 when the mutual inductance between windings is +M and −M, respectively.
Figure 4B:
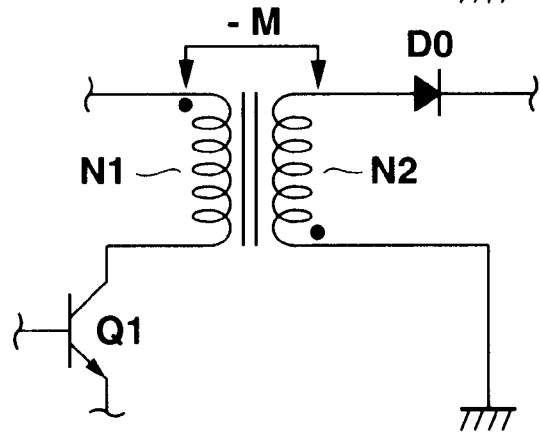

For example, in an operation where the components mentioned assume a connection configuration as shown in FIG. 4A, mutual inductance M is +M, but in another operation where the components assume such a connection configuration as shown in FIG. 4B, mutual inductance M is −M. In circuit 100, the polarities of primary winding N1 and secondary winding N2 exhibit the additive mode.

Further, in power supply circuit 100, a secondary side parallel resonance capacitor C2 is provided for secondary winding N2. Thus, a parallel resonance circuit is formed from leakage inductance L2 of secondary winding N2 and capacitance of secondary side parallel resonance capacitor C2. The parallel resonance circuit converts an alternating voltage excited in secondary winding N2 into a resonance voltage. Consequently, the voltage resonance operation is performed on secondary side 110. Thus, power supply circuit 100 includes a parallel resonance circuit provided on primary side 105 for making a switching operation of the voltage resonance type, and another parallel resonance circuit provided on secondary side and formed from secondary winding N2 and parallel resonance capacitor C2. It is noted that, in the present specification, a switching converter of a construction including resonance circuits for both of the primary side and the secondary side in this manner is suitably referred to as "composite resonance switching converter".

Where secondary side parallel resonance capacitor C2 is provided for secondary winding N2 in the manner described above, since the power on secondary side 110 upon rectification operation increases by a resonance operation of the secondary side parallel resonance circuit, the load power available with the power supply circuit can be increased. For example, power supply circuit 100 can cope with a load power of 1 W to 50 W as a result of insertion of secondary side parallel resonance capacitor C2. However, where the load power condition is 1 W or less, such as when power supply circuit 100 is used as a standby power supply, secondary side parallel resonance capacitor C2 is not inserted to adjust the load power.

FIGS. 5A to 5J are waveform diagrams illustrating operation of power supply circuit 100. More particularly, FIGS. 5A to 5E show operation waveforms at different portions of power supply circuit 100 when the load power is at maximum load power (Pomax=50 W) and AC input voltage VAC is at minimum AC input power (VACmi=80 V), and FIGS. 5F to 5J show operation waveforms of the same portions as those of FIGS. 5A to 5E but when the load power is at a minimum load power (Pomin (Po=0)) and AC input voltage VAC is at a maximum AC input voltage (VACinax). Further, waveforms indicated by broken lines in FIGS. 5B, 5C, 5D and 5E illustrate operations where secondary side parallel resonance capacitor C2 is omitted. The waveforms indicated by solid lines in FIGS. 5B, 5C, 5D and 5E illustrate operations where secondary side parallel resonance capacitor C2 is connected.

Since switching element Q1 performs a switching operation, a resonance voltage Vcr which appears between the collector and the emitter of switching element Q1 has a waveform which exhibits, as seen from FIG. 5A or 5F, the zero level during a period TON within which switching element Q1 is on but exhibits a pulse of a sine waveform during a period TOFF within which switching element Q1 is off. Further, as can be recognized by comparison between resonance voltages Vcr illustrated in FIGS. 5A and 5F, the switching frequency is controlled to a higher value when the load power is at minimum load power (Pomin=0) and AC input voltage VAC is at maximum AC input voltage (VACmax=288 V) than when the load power is at maximum load power (Pomax=50 W) and AC input voltage VAC is at minimum AC input power (VACmin=80 V) by the constant voltage control operation described above.

Thereupon, collector current Icp which flows to the collector of switching element Q1 exhibits a waveform such that it flows to the collector of switching element Q1 during period TON but exhibits the zero level during period TOFF, as shown in FIGS. 5B and 5G. Further, switching output current, which flows through primary winding N1, has a form of alternating current corresponding substantially to a switching frequency and has a waveform proximate to a sine wave by an action of the primary side parallel resonance circuit.

The rectification operation of secondary side 110 of power supply circuit 100 is an additive mode (forward system), as described hereinabove with reference to FIG. 4. It is illustrated as an operation where rectifier diodes D01 and D02 are rendered conducting and rectification current I2 flows substantially corresponding to period TON during which switching element Q1 is on, as shown in FIGS. 5E and 5J. Meanwhile, a secondary side parallel resonance voltage V2 generated in the secondary side parallel resonance circuit exhibits a waveform such that, when rectifier diodes D01 and D02 are non-conducting (off), it is a negative sine wave, but when rectifier diodes D01 and D02 are conducting (on), it is clamped at the level of DC output voltage E0 (E01 or E02) with positive polarity.

It is noted that, where parallel resonance capacitor C2 is not inserted, when the load power is at maximum load power Pomax is (Pomax=50 W) and AC input voltage VAC is at minimum AC input power VACmin=80 V, the switching operation waveforms (Icp, I1, V2 and I2) vary as shown by the broken line waveforms of FIGS. 5B to 5E.

As can be recognized from the foregoing description, power supply circuit 100 is formed as a composite resonance switching converter which includes a voltage resonance converter (parallel resonance circuit) provided on primary side 105 and a parallel resonance circuit and a half-wave rectifier circuit provided on secondary side 110.

Figure 6:
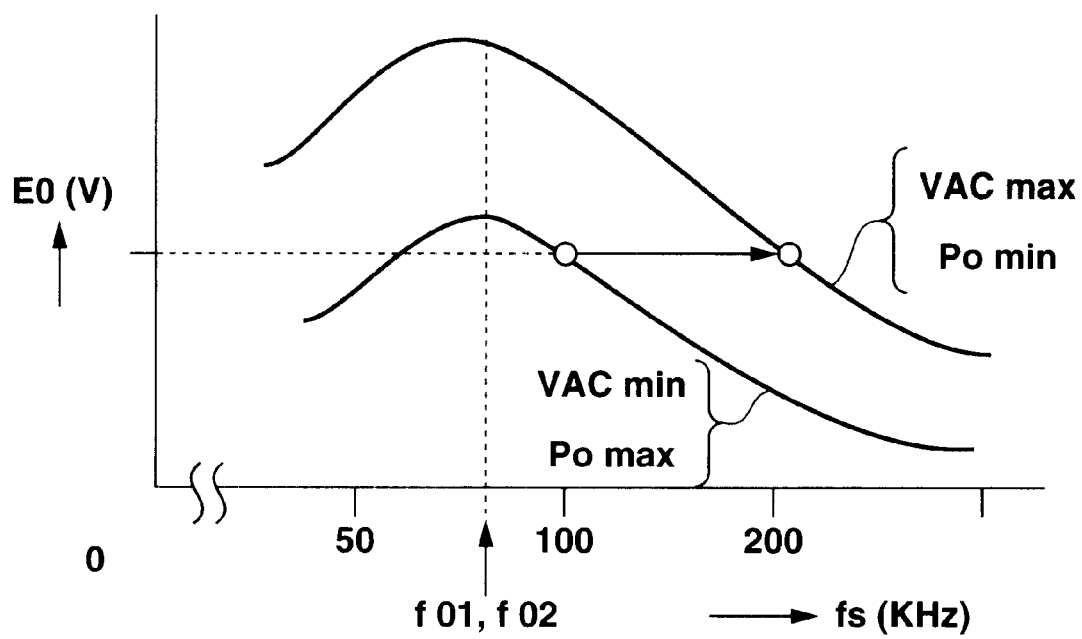
FIG. 6 is a diagrammatic view illustrating a relationship between a switching frequency and a secondary side DC output voltage of the power supply circuit of FIG. 1.
Figure 7:
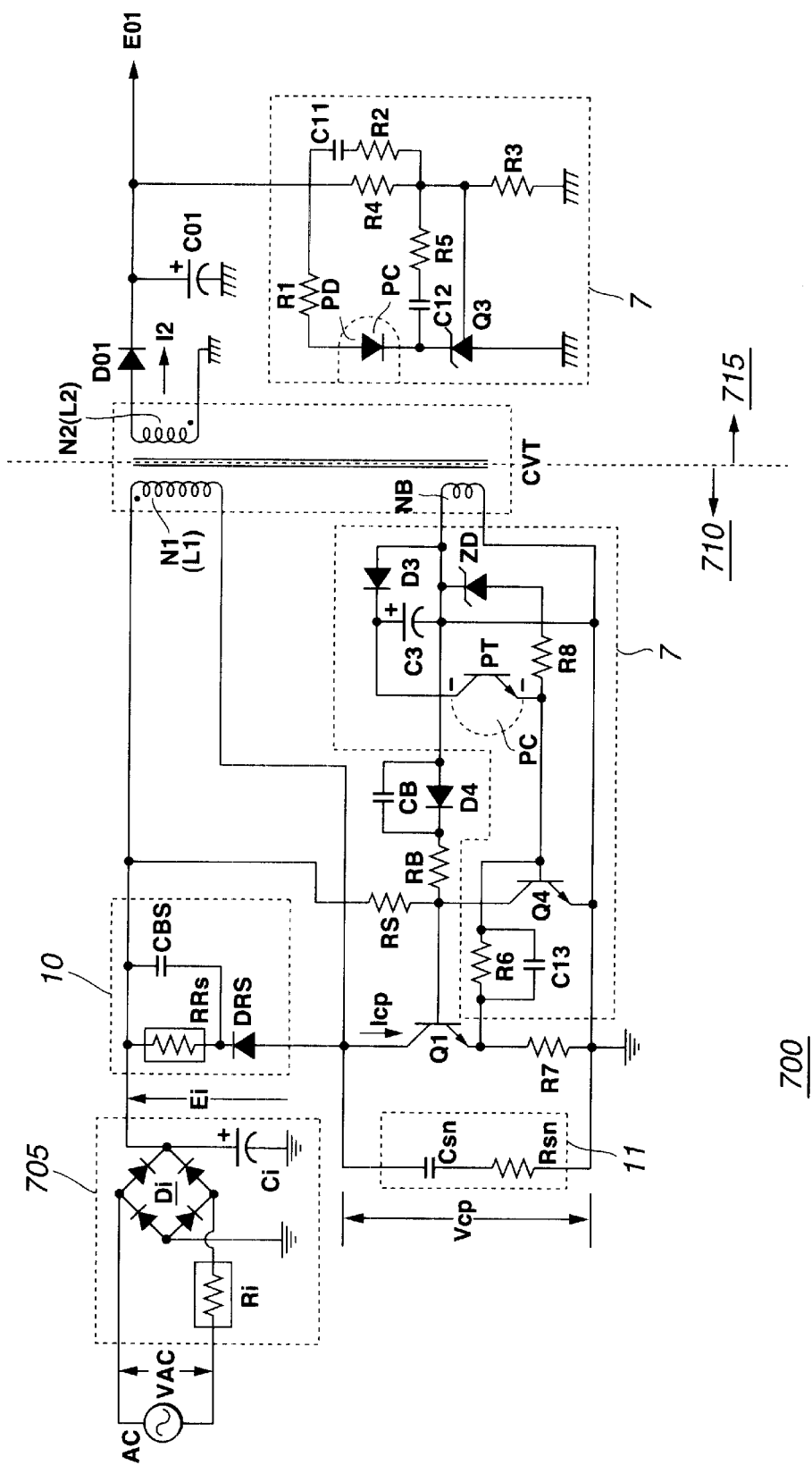
FIG. 7 is a circuit diagram showing a construction of a conventional power supply circuit.

FIG. 6 illustrates a relationship between a switching frequency fs and secondary side DC output voltage E0 (E01) in power supply circuit 100. In FIG. 6, the axis of abscissa indicates the switching frequency and the axis of ordinate indicates the level of secondary side DC output voltage E0.

As can be seen from resonance curves indicated by solid lines, with power supply circuit 100, for example, in order to stabilize secondary side DC output voltage E01 at a desired level (for example, approximately 5 V) against a variation of the load or a variation of AC input voltage VAC, switching frequency fs is controlled to be within a range from 100 KHz to 200 KHz (i.e., a range of 100 KHz).

In contrast, for example, where power supply circuit 700 is used, in order to convert secondary side DC output voltage E01 into a constant voltage, switching frequency fs should be controlled to be within the range, for example, from 25 KHz to 250 KHz (i.e., a range of 225 KHz), as described hereinabove.

The reason that the control range of switching frequency fs is reduced for power supply circuit 100 will now be described.

In power supply circuit 100, the constant voltage controlling action is provided by controllably varying switching frequency of switching element Q1 by an operation of the constant voltage controlling circuit system composed of control circuit 1 and orthogonal control transformer PRT as described hereinabove. This operation is illustrated also in FIGS. 5A to 5J. For example, as can be recognized from comparison between the waveforms (Vcr and Icp) of FIGS. 5A and 5B and FIGS. 5F and 5G, in order to vary the switching frequency, power supply circuit 100 controllably varies period TON during which switching element Q1 is on while period TOFF during which switching element Q1 is off is kept fixed. In other words, it can be considered that, as constant voltage controlling operation of power supply circuit 100,it operates to controllably vary the switching frequency to effect resonance impedance control for the switching output, and to simultaneously perform continuity angle control (PWM control) of switching element Q1 in a switching period. This composite controlling operation is realized by a single control circuit system.

Actually, when Pomin=0 and VAC=288 V to which the operation waveforms shown in FIGS. 5F and 5G correspond, period TON decreases in response to the switching frequency from when Pomax=50 W and VAC=80 V to which the operation waveforms shown in FIGS. 5A and 5B correspond. Consequently, also the current amount of current I1, which flows into the voltage resonance converter from smoothing capacitor Ci is limited as can be seen from a transition of current I1 from that of FIG. 5C to that of FIG. 5H. Consequently, the control sensitivity is improved.

Further, in FIG. 6, a parallel resonance frequency fo1 of the primary side parallel resonance circuit and a parallel resonance frequency fo2 of the secondary side parallel resonance circuit with respect to switching frequency fs are shown. Here, for example, if the inductances and the capacitances are selected so that parallel resonance frequency fo1 and parallel resonance frequency fo2 may be equal to each other at or around 80 KHz, as shown in FIG. 6, then an operation that the resonance impedances of the two parallel resonance circuits are controlled simultaneously to controllably vary the secondary side output voltage is obtained by the switching frequency control operation (constant voltage control operation) described above. This operation also improves the control sensitivity significantly.

By improving the control sensitivity in the manner described above, the substantial control range is expanded with power supply circuit 100. Consequently, the variation width of the switching frequency can be reduced when compared with those in power supply circuits 700 and 900.

A pulse obtained as resonance voltage Vcr, illustrated in FIG. 5A or 5F, within period TOFF is generated because the impedance of the parallel resonance circuit on the primary side of the voltage resonance converter acts upon DC input voltage (rectified smoothed voltage) Ei. A level Lvcr of the pulse of resonance voltage Vcr is represented by $$Lvcr=Ei\{1+(\pi/2)(TON/TOFF)\} \qquad (1)$$

where Ei is the rectified smoothed voltage level, and TOFF and TON are time lengths of an off period and an on period within one switching period of switching element Q1, respectively.

It is assumed here that power supply circuit 100 is used commonly with AC 100 V and AC 200 V as commercial AC power supplies. Where AC 100 V (VAC=80 V) is used, DC input voltage (rectified smoothed voltage) Ei is 110 V, and where AC 200 V (VAC=288 V) is used, DC input voltage (rectified smoothed voltage) Ei is 400 V. Thus, DC input voltage (rectified smoothed voltage) Ei for AC 200 V varies within a range approximately 3.6 times that of DC input voltage (rectified smoothed voltage) Ei for AC 100 V.

As described above, the constant voltage control of power supply circuit 100 varies the switching frequency by controllably varying period TON during which switching element Q1 is on while period TOFF during which switching element Q1 is off is kept fixed. In other words, the voltage supply circuit operates such that, as DC input voltage (rectified smoothed voltage) Ei increases, it decreases period TON as much.

If this operation is made to correspond to expression (1) given hereinabove, even if rectified smoothed voltage Ei for AC 200 V has a variation width of 3.6 times that for AC 100 V, level Lvcr of resonance voltage Vcr does not increase in proportion to a rise in rectified smoothed voltage Ei, but the rising ratio is suppressed. Actually, as seen from FIGS. 5A and 5F, when AC input voltage VAC varies from VAC=80 V to VAC=288 V (that is, variation of rectified smoothed voltage Ei), level Lvcr of resonance voltage Vcr varies from Lvcr=550 Vp to Lvcr=715 Vp. Thus, the increasing ratio of level Lvcr is suppressed to approximately 1.3 times. Therefore, for switching element Q1 and parallel resonance capacitor Cr to which a pulse of resonance voltage Vcr is applied, a device having a voltage withstanding property against, for example, 900 V may be selectively used. Consequently, an inexpensive device can be selectively used for switching element Q1 and parallel resonance capacitor Cr. Particularly for switching element Q1 which is a bipolar transistor, a device which has better characteristics in regard to the saturation voltage VCE(SAT), storage time tSTG, fall time tf, current amplification factor hFE, and so forth can be selectively used.

Further if the same wire material is used for control winding NC, detection winding ND, and driving winding NB of orthogonal control transformer PRT provided in power supply circuit 100, then the management of parts and the process of production are simplified and the production efficiency is improved.

Furthermore, since power supply circuit 100 includes the secondary side parallel resonance circuit, a state wherein secondary side parallel resonance voltage V2 is produced can be obtained by a parallel resonance operation of the secondary side parallel resonance circuit even if load short-circuiting occurs.

Therefore, although secondary side DC output voltage E01 drops, for example, to 10 V from 15 V which can occur during ordinary operation, supply of secondary side output voltage E01 to control circuit 1 can be maintained. Thus, power supply circuit 100 is constructed such that, upon load short-circuiting, an IC for error amplification in control circuit 1 is short-circuited so that the DC current supplied to control winding NC of orthogonal control transformer PRT is maintained to prevent a drop in the switching frequency. As a result, an increase of the primary side series resonance current I1 and the collector current Icp which flows to the collector of switching element Q1 is suppressed and, thus, thermorunaway of switching element Q1 is prevented.

In short, power supply circuit 100 has a load short-circuiting preventing function therein and can continue its stable switching operation even upon load short-circuiting. Consequently, power supply circuit 100 eliminates the need for a protection part such as an IC link fuse.

In an experiment for testing the performance of power supply circuit 100, a power conversion efficiency of approximately 90% was obtained when load power Po was Pomax=50 W and AC input voltage VAC was VAC=100 V. When load power Po was Pomin=10 W and AC input voltage VAC was VAC=240 V, a power conversion efficiency of approximately 80% was obtained. Thus, the experiment shows that the power conversion efficiency of power supply circuit 100, particularly where the load power is the minimum load power, exhibits an improvement of approximately 20% over alternative power supply circuits.

While power supply circuit 100 is constructed such that a self-excited voltage resonance converter is provided on primary side 105, it may be modified, for example, to include an oscillation drive circuit in the form of an IC (integrated circuit) in place of the self-excited oscillation drive circuit so that the switching element of a voltage resonance converter is driven by the oscillation drive circuit.

In this instance, as constant voltage control, a drive signal waveform produced by the oscillation drive circuit is controllably varied in response to secondary side output voltage level E01. In the control, the driving signal waveform may be produced such that period TOFF during which switching element is off is fixed, whereas period TON during which switching element is on is decreased in response to a rise of secondary side output voltage level E01. By the control just described, power supply circuit 100 operates similarly as described hereinabove with reference to FIGS. 5A to 5J. It is to be noted that, where such a separated excited construction as just described is adopted, orthogonal control transformer PRT is omitted.

Further, where the separately excited construction described above is adopted, it is possible to adopt, in place of the single bipolar transistor (BJT) as switching element Q1, a Darlington circuit wherein two bipolar transistors (BJT) are connected in a Darlington connection. Also it is possible to use, in place of the single bipolar transistor (BJT), a MOSFET (MOS field effect transistor; metal oxide film semiconductor), an IGBT (insulated gate bipolar transistor) or a SIT (electrostatic induction thyristor). Where the Darlington circuit or one of the devices mentioned above is used as switching element Q1, higher efficiency can be achieved.

Where any of the devices is used as switching element Q1, though not shown, the construction of the drive circuit for switching element Q1 would be modified so as to satisfy a characteristic of the device to be actually adopted in place of the BJT. For example, if a MOSFET is used as switching element Q1, then the drive circuit for switching element Q1 may be constructed such that it drives switching element Q1 in a separately excited manner.

It will thus be seen that the objects set forth above, among those made apparent from the preceding description, are efficiently attained and, because certain changes may be made in the construction(s) set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therein.

Industrial Applicability

As described above, a switching power supply circuit according to the present invention includes an insulating converter transformer, which is formed by a core with no gap and a primary and secondary winding wound on the core such that the mutual inductance between the windings exhibits an additive mode. A half-wave rectifier circuit is provided on the secondary side of the circuit and performs a rectification operation in the additive mode to obtain a secondary side DC output voltage. In a constant voltage control circuit system for stabilizing the secondary side output voltage, the switching frequency of a switching element is varied in response to the secondary side output voltage level to control the resonance impedance of a primary side parallel resonance circuit and the continuity angle of the switching element compositely. Thus, the switching power supply circuit which is small, lightweight, and highly efficient in power conversion can be provided.

What is claimed is:

1. A switching power supply circuit, comprising:

a smoothing rectifier for receiving an AC power supply, producing and outputting rectified smoothed DC input voltage having a level equal to that of the AC power supply;

an insulating converter transformer having a gapless core for obtaining a predetermined coupling efficiency and a primary winding and a secondary winding wound on said core with polarities such that an additive operation mode is provided;

a switching circuit for switching the DC input voltage on and off and outputting the switched voltage to said primary winding of said insulating converter transformer, thereby creating an alternating voltage at said secondary winding of said insulating converter transformer;

a primary side parallel resonance circuit formed from a leakage inductance component of said primary winding of said insulating converter transformer and a capacitance of a parallel resonance capacitor for operating said switching circuit in a voltage resonance type operation;

a DC output voltage circuit for receiving the alternating voltage at said secondary winding of said insulating converter transformer and performing a half-wave rectification on the alternating voltage to produce a secondary side DC output voltage having a level substantially equal to that of the rectified smoothed DC input voltage; and a constant voltage control circuit for varying a switching frequency of said switching circuit in response to a level of the secondary side DC output voltage to control a resonance impedance of said primary side parallel resonance circuit and vary a continuity angle of said switching circuit so as to perform constant voltage control of the secondary side DC output voltage.

2. A switching power supply circuit according to claim 1, further comprising a secondary side parallel resonance capacitor connected in parallel to said secondary winding of said insulating converter transformer so that a secondary side parallel resonance circuit is formed from a leakage inductance component of said secondary winding of said insulating converter transformer and a capacitance of said secondary side parallel resonance capacitor in order to satisfy a load power condition higher than a predetermined level.

3. A switching power supply circuit according to claim 1, wherein said constant voltage control circuit comprises an orthogonal control transformer as a saturable reactor having a detection winding and a driving winding connected in series to said primary winding of said insulating converter transformer and a control winding whose winding direction is orthogonal to those of said detection winding and said driving winding, and controlably varies the switching frequency by varying a control current to said control winding in response to a level of the secondary side DC output voltage so as to vary an inductance of said driving winding, said switching circuit comprises a series resonance circuit formed from a series connection of at least said driving winding and a resonance capacitor, and said power supply circuit further comprises a self-excited oscillation drive circuit for driving said switching circuit in a self-excited manner in response to a resonance output of said series resonance circuit.

4. A switching power supply circuit according to claim 3, wherein said detection winding and said driving winding are formed from the same type of material as used for said control winding.

5. A switching power supply circuit according to claim 1, wherein said switching circuit includes a separately excited drive circuit for driving said switching circuit in a separately excited manner, and said constant voltage control circuit controllably varies an on period of said switching circuit while keeping an off period of said switching circuit fixed in response to a level of the secondary side DC output voltage to controllably vary the switching frequency.

6. A switching power supply circuit according to claim 1, wherein said switching circuit comprises a Darlington circuit, which includes a bipolar transistor.

7. A switching power supply circuit according to claimn 1, wherein said switching circuit comprises a MOS field effect transistor.

8. A switching power supply circuit according to claim 1, wherein said switching circuit comprises an insulated gate bipolar transistor.

9. A switching power supply circuit according to claim 1, wherein said switching circuit comprises an electrostatic induction thyristor.

* * * * *